United States Patent
Oshikiri

(10) Patent No.: US 7,565,476 B2
(45) Date of Patent: Jul. 21, 2009

(54) MEMORY DEVICE

(75) Inventor: Takashi Oshikiri, Osaka (JP)

(73) Assignee: MegaChips LSI Solutions Inc., Osaka-shi (JP)

( * ) Notice: Subject to any disclaimer, the term of this patent is extended or adjusted under 35 U.S.C. 154(b) by 345 days.

(21) Appl. No.: 11/555,908

(22) Filed: Nov. 2, 2006

(65) Prior Publication Data

US 2007/0106859 A1 May 10, 2007

(30) Foreign Application Priority Data

Nov. 7, 2005 (JP) ............................. 2005-321991

(51) Int. Cl.
*G06F 12/00* (2006.01)
(52) U.S. Cl. .................................. 711/103; 365/185.01
(58) Field of Classification Search .................. 711/103; 365/185.01
See application file for complete search history.

(56) References Cited

U.S. PATENT DOCUMENTS

| | | | |
|---|---|---|---|
| 5,379,401 A * | 1/1995 | Robinson et al. ............ | 711/103 |
| 2003/0093612 A1* | 5/2003 | Ootani et al. ................. | 711/103 |
| 2004/0213066 A1* | 10/2004 | Imamiya ...................... | 365/222 |
| 2005/0157560 A1* | 7/2005 | Hosono et al. ............. | 365/185.22 |

FOREIGN PATENT DOCUMENTS

| | | |
|---|---|---|
| JP | 6-274406 | 9/1994 |
| JP | 9-114779 | 5/1997 |
| JP | 3033755 | 2/2000 |

\* cited by examiner

*Primary Examiner*—Kevin L Ellis
*Assistant Examiner*—Hashem Farrokh
(74) *Attorney, Agent, or Firm*—Oblon, Spivak, McClelland, Maier & Neustadt, P.C.

(57) ABSTRACT

The present invention provides a memory device of a type that outputs a ready signal to the outside, and that is capable of achieving an enhanced data transfer rate and a uniform latency time. A memory device according to the present invention includes a ready signal sending portion, and the ready signal sending portion monitors a memory portion to detect the memory portion becoming ready for reading or writing of specified data. The ready signal sending portion generates a first ready signal that changes from a busy state to a ready state after the detection and an enabling signal that changes from a disable state to an enable state on the basis of a preset ready generating timing value. When the first ready signal is in the ready state and the enabling signal is in the enable state, the ready signal sending portion sends to the outside a second ready signal that is in a ready state.

4 Claims, 2 Drawing Sheets

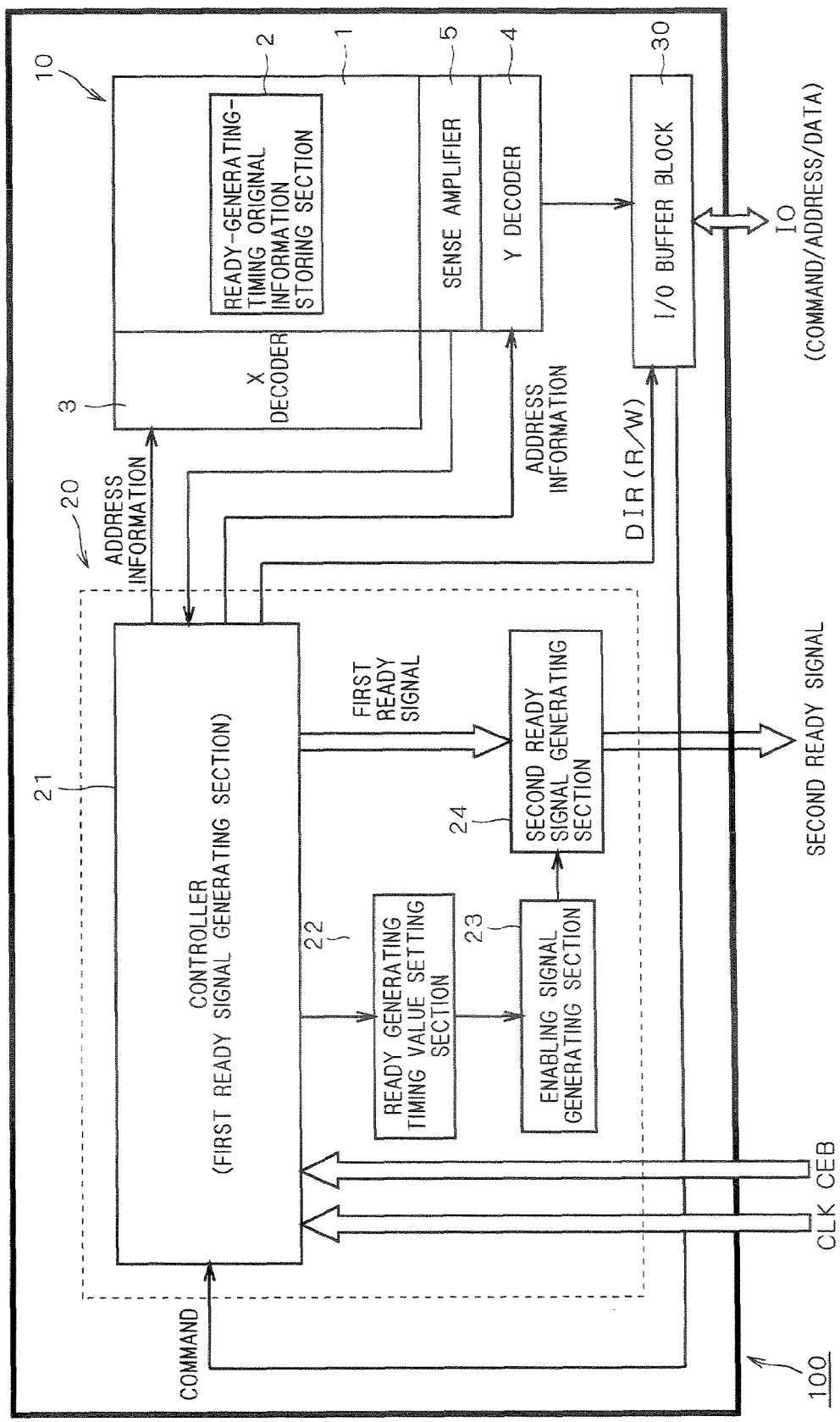

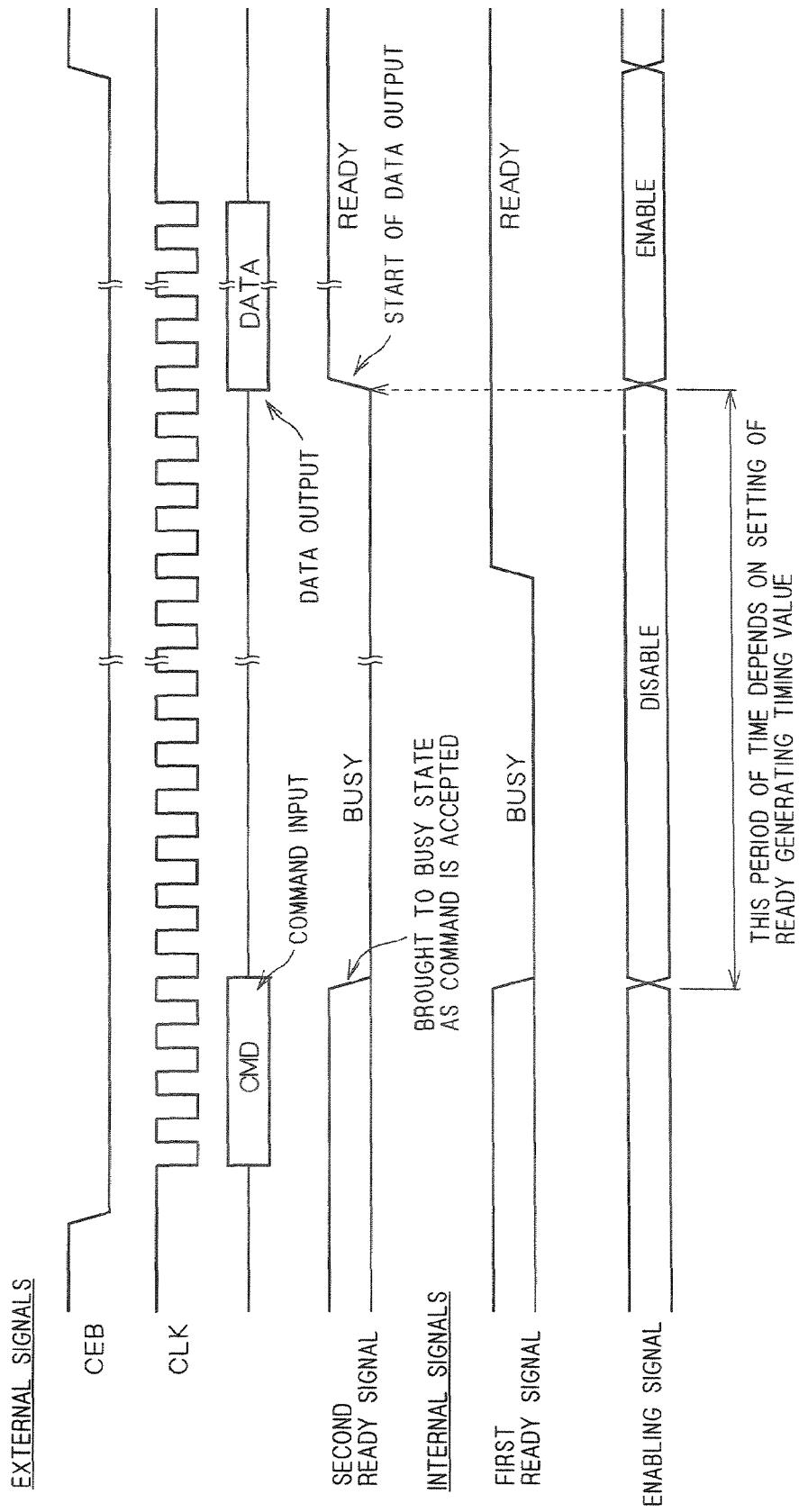

MEMORY DEVICE

BACKGROUND OF THE INVENTION

1. Field of the Invention

The present invention relates to memory devices, and particularly to a memory device that is capable of generating a ready signal that indicates a state in which specified data is ready for reading, or a state in which an operation of writing or erasing specified data has been finished.

2. Description of the Background Art

Because of the increasing memory capacities of memory devices (e.g., semiconductor memory devices), the time required from the input of a command about reading to the output (read) of the specified data (latency time) is becoming longer (in general, the time required for an operation of writing/erasing specified data is also becoming longer). In a conventional approach adopted for such memory devices, the host equipment sends a read command and then waits for a sufficient time before reading specified data from the memory (or, when an operation of writing or erasing specified data starts, the next processing is performed after waiting for a sufficient time).

However, in such a case, the specified data is read out while allowing for the longest latency time, and therefore the data transfer rate is considerably lowered.

To solve this problem, memory devices have been developed which output a ready signal to the host immediately after the data output has been readied. Such memory devices offer higher data transfer rates.

However, the memory devices that send ready signals involve considerable variations of latency time, depending upon the addresses specified in read operations. Because of the considerable variations of latency time, such memory devices are unsuitable for systems that are sensitive to timing.

SUMMARY OF THE INVENTION

An object of the present invention is to provide a memory device of a type that outputs a ready signal to the outside, and that is capable of achieving an enhanced data transfer rate and a uniform latency time.

According to a first aspect of the present invention, a memory device receives from outside a command about reading, writing, or erasing of specified data, and sends a ready signal to the outside when the specified data has become ready for reading on the basis of the command, or when an operation of writing or erasing the specified data has ended on the basis of the command. The memory device includes a memory portion and a ready signal sending portion. The memory portion is capable of any of reading, writing, and erasing of the specified data. The ready signal sending portion sends the ready signal to the outside when a first condition and a second condition are satisfied. The first condition is satisfied when a state in which the specified data is ready for reading from the memory portion is detected, or when the end of the operation of writing or erasing the specified data to or from the memory portion is detected. The second condition is satisfied when a preset ready generating timing is satisfied.

Thus, by setting the ready generating timing at a desired value, it is possible to generate and send out a ready signal that is appropriate to achieve an enhanced data transfer rate and uniform latency time. It is thus possible to provide a memory device that achieves an enhanced data transfer rate and uniform latency time.

According to a second aspect of the invention, in the memory device of the first aspect, the ready signal sending portion monitors the memory portion to detect the state in which the specified data is ready for reading from the memory portion, or to detect the end of the operation of writing or erasing the specified data to or from the memory portion, and generates a first ready signal that changes from a busy state to a ready state after the detection. The ready signal sending portion also generates an enabling signal that changes from a disable state to an enable state on the basis of a preset value of the ready generating timing. Then, the ready signal sending portion sends a second ready signal in a ready state to the outside when the first ready signal is in the ready state and the enabling signal is in the enable state.

Thus, by setting the ready generating timing value at a desired value, it is possible to generate and send out a second ready signal that is appropriate to achieve an enhanced data transfer rate and uniform latency time. It is thus possible to provide a memory device that achieves an enhanced data transfer rate and uniform latency time.

According to a third aspect of the invention, in the memory device of the second aspect, the ready signal sending portion includes a first ready signal generating portion, a ready generating timing value setting portion, an enabling signal generating portion, and a second ready signal generating portion. The first ready signal generating portion generates the first ready signal. The ready generating timing value setting portion is capable of setting the ready generating timing value. The enabling signal generating portion generates the enabling signal that goes into the disable state when the command about reading, writing, or erasing is inputted and that goes into the enable state according to a timing based on the ready generating timing value. The second ready signal generating portion receives the first ready signal and the enabling signal to generate the second ready signal.

Thus, the ready signal sending portion can be realized as hardware.

According to a fourth aspect of the invention, in the memory device of the third aspect, the memory portion has an area where original information about the ready generating timing value is stored. When the memory device receives a given command sent from outside, the ready generating timing value is set in the ready generating timing value setting portion on the basis of the original information.

Thus, it is possible to easily set/change the original information about an arbitrary ready generating timing value at the time of shipment (that is, the original information can be set/changed more flexibly at the time of shipment).

According to a fifth aspect of the invention, in the memory device of the third aspect, the ready generating timing value setting portion is capable of changing the ready generating timing value in setting state. The ready generating timing value that is set in the ready generating timing value setting portion is changed on the basis of an operation applied from outside.

Thus, it is possible for, e.g., a host, to arbitrarily change/set the ready generating timing value to an optimum value at any time.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a block diagram showing the configuration of a memory device according to the present invention; and FIG. 2 is a timing chart illustrating the operation of the memory device of the invention.

DESCRIPTION OF THE PREFERRED EMBODIMENTS

When the memory device of the invention receives from the outside a command about reading, writing, or erasing of specified data, the memory device is capable of sending to the outside a ready signal in a ready state when the specified data has become ready for reading on the basis of the command, or when the operation of writing or erasing the specified data has ended on the basis of the command.

Now, the present invention will be specifically described referring to the diagrams illustrating the preferred embodiments. FIG. 1 is a block diagram showing a preferred embodiment of the memory device of the invention.

As shown in FIG. 1, the memory device (e.g., a semiconductor memory device) 100 includes a memory portion 10, a ready signal sending portion 20, and an I/O buffer portion 30.

The memory portion 10 includes a memory array 1, a ready-generating-timing original information storing portion 2, an X decoder 3, a Y decoder 4, and a sense amplifier 5. The ready signal sending portion 20 includes a controller (a controller that controls and supervises the entire memory device 100, and it can be regarded also as a first ready signal generating portion) 21, a ready generating timing value setting portion 22, an enabling signal generating portion 23, and a second ready signal generating portion 24. As will be described later, the ready signal sending portion 20 finally sends out a second ready signal.

First, the memory portion 10 will be described.

The memory array 1 is formed of an array of memory cells for storing data. Specified data is read from, written to, and erased from the memory array 1. The memory array 1 is a nonvolatile memory.

As shown in FIG. 1, the ready-generating-timing original information storing portion 2 is provided in a part of the storage area of the memory array 1. For example, the ready-generating-timing original information storing portion 2 stores an encrypted ready generating timing value (which can be regarded as original information about a ready generating timing value).

The X decoder 3 and the Y decoder 4 are circuits that covert externally received addresses to information indicating physical locations of memory cells in the memory array 1. The sense amplifier 5 is a device that amplifies the difference between current values of "0" and "1" signals outputted from the memory array 1, and also recognizes whether the signal is a "0" signal or a "1" signal.

Next, the ready signal sending portion 20 will be described.

The ready signal sending portion 20 sends out a ready signal to the outside (e.g., to an external host) when a first condition and a second condition are both satisfied. The first condition is satisfied when a state in which specified data is ready for reading from the memory portion 10 is detected, or when the end of an operation of writing or erasing specified data to or from the memory portion 10 is detected, and the second condition is satisfied when a preset ready generating timing is satisfied.

The controller 21 is a circuit that controls operations of individual parts of the memory device 100. Specifically, the controller 21 interprets various commands inputted to the memory device 100 and controls operations of individual parts on the basis of the commands.

For example, when a command about reading is received, the controller 21 recognizes that the command is a "read command", extracts address information from the command, and sends the address information to the memory portion 10.

As will be described later, the controller 21 functions also as a circuit that generates a first ready signal. Accordingly, the controller 21 can be regarded also as a first ready signal generating portion.

The controller 21 monitors the memory portion 10 (more specifically, it monitors the sense amplifier 5). When the controller 21 senses that the memory portion 10 (more specifically, the memory array 1) is ready for the reading of specified data, or that the memory portion 10 (more specifically, the memory array 1) has finished writing or erasing specified data (which can be regarded as the first condition), then the controller 21 generates a first ready signal that changes from a busy state to a ready state after the detection. The first ready signal goes into the busy state when a command about reading, writing, or erasing of specified data is inputted to the memory device 100.

The ready generating timing value setting portion 22 is capable of setting a ready generating timing value. The ready generating timing value that is set in the ready generating timing value setting portion 22 can be changed on the basis of an operation applied from the outside. The ready generating timing value setting portion 22 is formed of a register, for example.

The enabling signal generating portion 23 generates an enabling signal that changes from a disable state to an enable state on the basis of the ready generating timing value (the condition that the ready generating timing is satisfied can be regarded as the second condition). The enabling signal goes into the disable state when a command about reading, writing, or erasing of specified data is inputted to the memory device 100. The enabling signal goes into the enable state according to a timing based on the ready generating timing value, as will be seen from the following description about operations.

The second ready signal generating portion 24 receives the first ready signal and the enabling signal. The second ready signal generating portion 24 generates the second ready signal in a ready state when the first ready signal is in the ready state and the enabling signal is in the enable state, and sends out the ready-state second ready signal to the outside.

In other words, when the enabling signal is in the enable state, the second ready signal generating portion 24 outputs the input first ready signal without changing its state (this output signal can be regarded as the second ready signal). On the other hand, when the enabling signal is in the disable state, the second ready signal generating portion 24 changes the input first ready signal to the busy state and outputs the busy-state signal (this output can be regarded as the second ready signal).

The I/O buffer portion 30 serves for input operations of various commands and output operations of data, for example. It also serves for input operations of write data and output operations of read data. The I/O buffer portion 30 thus serves for both of "input" and "output" modes of the data bus. The input mode and output mode are switched on the basis of a signal from the controller 21.

In the memory device 100, when the I/O buffer portion 30 receives an input of a certain command from outside, that command is sent to the controller 21. In this preferred embodiment, as shown in FIG. 1, the controller 21 directly receives a clock signal CLK and a chip enable signal CEB from outside.

Also, the controller 21 sends address information about specified data to the X decoder 3 and the Y decoder 4. The controller 21 monitors the sense amplifier 5 to see whether the specified data has become ready for read.

As mentioned above, the I/O buffer portion 30 receives a DIR signal from the controller 21 (see FIG. 1). The I/O buffer portion 30 is then switched between the input mode and the output mode on the basis of the DIR signal.

Next, operations of the memory device 100 of the invention will be described referring to FIG. 1 and the timing chart of FIG. 2. The description explains an operation of reading specified data as an example.

Now, FIG. 2 shows the chip enable signal CEB at the top. The second one from the top is the clock signal CLK. The third one shows a command about read that is inputted to the I/O buffer portion 30, and it also shows specified data that is outputted to the outside. The fourth one is the second ready signal, and the fifth one is the first ready signal. The signal shown at the bottom is the enabling signal.

The first to fourth signals from the top of FIG. 2 are signals that are inputted from outside of the memory device 100 or sent out of the memory device 100. On the other hand, the fifth and bottom signals in FIG. 2 are signals that are transferred within the memory device 100.

First, for example, when the system including the memory device 100 is turned on and the operations shown below are enabled, then the host equipment, external to the memory device 100, provides a predetermined command to the memory device 100 (this operation is not shown in FIG. 2).

Then, the controller 21 reads, for example, an encrypted ready generating timing value (which can be regarded as original information about the ready generating timing value) from the ready-generating-timing original information storing portion 2 (this operation is not shown in FIG. 2).

Next, according to predetermined rules, the controller 21 deciphers the original information about the ready generating timing value to generate an optimum ready generating timing value. Then, according to a given command inputted from the host equipment, the controller 21 stores (sets) the generated ready generating timing value into the ready generating timing value setting portion 22 (this operation is not shown in FIG. 2).

The ready generating timing value (the encrypted original information) is stored (set) in the ready-generating-timing original information storing portion 2 at the time of shipment of the memory device 100, for example. The ready generating timing value is determined to achieve an enhanced data transfer rate and uniform latency time, for example (considering the tradeoff between the two: the ready generating timing value set from this point of view is referred to as an optimum ready generating timing value).

For example, when there are a plurality of vendors of the memory device 100, the vendors set the ready generating timing value at a same value at the time of shipment of the memory devices 100 of the invention. This allows parties who bought the memory devices 100 to construct systems using memory devices 100 all capable of reading specified data according to the same timing.

Also, when the memory devices 100 are shipped to a plurality of parties who demand different ready generating timing values, the ready generating timing value may be set at an appropriate value in each memory device 100 such that the enhancement of data transfer rate and the uniformity of latency time can be satisfied to some extent at all parties.

It is also possible to change the ready generating timing value set in the ready generating timing value setting portion 22 through an external operation.

For example, the memory device 100 receives "a command for changing the ready generating timing value" from host equipment. The controller 21 then analyzes the command and provides control to change the ready generating timing value set in the ready generating timing value setting portion 22.

The ready generating timing value may be changed directly from the host equipment using an I/F (interface) provided specially for that operation, separately from the memory I/F.

Next, the memory device 100 receives from the host equipment a command (CMD) for reading specified data (see the third signal from the top of FIG. 2).

The controller 21 thus receives the command and then analyzes the command. In this example, as a result of the analysis, the controller 21 recognizes that the command is about read, and the controller 21 generates the first ready signal in a busy state. The controller 21 then sends the generated first ready signal to the second ready signal generating portion 24 (see the fifth signal of FIG. 2).

The controller 21, having recognized that the command is about read, performs the operations below, in parallel with the operation above. That is, the controller 21 causes the enabling signal generating portion 23 to generate the enabling signal in a disable state. Also, the controller 21 extracts the address information included in the read command, and sends the address information to the X decoder 3 and the Y decoder 4.

With the parallel operation by the controller 21 (the parallel operation is performed by the controller 21 through the ready generating timing value setting portion 22), the enabling signal generating portion 23 sends the disable-state enabling signal to the second ready signal generating portion 24 (see the signal at the bottom of FIG. 2). The memory portion 10 starts making preparations for reading specified data.

The second ready signal generating portion 24 is now receiving the first ready signal in the busy state and the enabling signal in the disable state. Accordingly, as can be seen from the description about the second ready signal generating portion 24, the second ready signal generating portion 24 generates the second ready signal in the busy state. The second ready signal generating portion 24 sends the busy-state second ready signal to the host equipment (see the fourth signal of FIG. 2).

The host equipment receives the busy-state second ready signal and waits for the operation of reading the specified data.

Suppose the memory portion 10 is now ready to read the specified data. Then, the controller 21, monitoring the sense amplifier 5, recognizes that the preparations have been made (which can be regarded as the first condition). The controller 21 then changes the first ready signal to the ready state. The ready-state first ready signal is sent to the second ready signal generating portion 24 (see the fifth signal of FIG. 2).

On the other hand, the enabling signal generating portion 23 changes the state of the enabling signal from the disable state to the enable state on the basis of the ready generating timing value stored (set) in the ready generating timing value setting portion 22. In this example, the optimum ready generating timing value indicates a timing that is later than the change of the first ready signal to the ready state (see the signal at the bottom of FIG. 2).

Accordingly, in this case, the second ready signal generating portion 24 receives the ready-state first ready signal and the disable-state enabling signal. Thus, as can be seen from the description about the second ready signal generating portion 24, the second ready signal generating portion 24 maintains the generation of the second ready signal in the busy state. The second ready signal generating portion 24 thus keeps sending the busy-state second ready signal to the host equipment (see the fourth signal from the top of FIG. 2).

Now, the enabling signal generating portion 23 keeps generating and sending the enabling signal in the disable state from when the memory device 100 received the command about read till when the period indicated by the ready generating timing value expires. Then, after the indicated period has expired, the enabling signal generating portion 23 changes the enabling signal to the enable state, and sends it to the second ready signal generating portion 24 (see the signal at the bottom of FIG. 2). The condition that the preset ready generating timing is satisfied can be regarded as the second condition.

For example, suppose that the ready generating timing value indicates a certain number of clocks. In this case, the certain number of clocks is compared with the number of clocks that have been inputted from outside (e.g., from the host equipment) after the memory device 100 received the command about read (the number of clock signals CLK shown in FIG. 1). Then, when the number of externally provided clocks exceeds said certain number of clocks. the enabling signal generating portion 23 changes the enabling signal from the disable state to the enable state.

Alternatively, the memory device 100 may be equipped with its own clock, in which case the state of the enabling signal may be changed (from the disable state to the enable state) on the basis of the number of its own clocks and said certain number of clocks.

Now, the second ready signal generating portion 24 is receiving the ready-state first ready signal and the enable-state enabling signal. Accordingly, the second ready signal generating portion 24 changes the second ready signal from the busy state to the ready state as mentioned above. The second ready signal generating portion 24 then sends the ready-state second ready signal to the host equipment (see the fourth signal from the top of FIG. 2). In other words, because the enabling signal is in the enable state, the second ready signal generating portion 24 outputs the input first ready signal to the host equipment without changing its state.

The host equipment receives the ready-state second ready signal and moves into a condition to read the specified data.

Next, after the second ready signal has changed to the ready state, the controller 21 controls the memory portion 10 and the I/O buffer portion 30 to enable the following operation.

That is, the controller 21 controls the memory portion 10 and the I/O buffer portion 30 such that the I/O buffer portion 30 can output the specified data to the host equipment sequentially in synchronization with rising or falling of the clock signal CLK (this clock signal CLK is sent from the host equipment, for example) (see the third signal from the top of FIG. 2).

Though not clearly shown in FIG. 2, the specified data is sequentially outputted in pieces in synchronization with rising or falling of the clock signal.

The host equipment judges data as valid when the data is outputted in synchronization with rising or falling of its own clock signal CLK while the second ready signal is in the ready state (the data is formed of a plurality of divided pieces of the specified data). The host equipment then captures the data (operation of reading the specified data).

Thus, in the memory device 100 of the invention, the final state of the ready signal (i.e., the busy state or ready state of the second ready signal) is controlled on the basis of the ready generating timing value that is set at the time of shipment.

It is therefore possible to provide the memory device 100 such that it can achieve an enhanced data transfer rate or a uniform latency time, or both of the enhanced data transfer rate and uniform latency time, on the basis of the setting of the ready generating timing value. For example, setting the optimum ready generating timing value in the above-described manner at the time of shipment allows the memory device 100 to achieve both of the enhanced rate and uniform latency time.

For example, when the first ready signal is used alone as in conventional techniques (i.e., when the second ready signal is not used), the timing by which the first ready signal attains the ready state involves considerable errors. This is because the timing by which the first ready signal attains the ready state depends on the read addresses and variations among individual memory devices. Memory devices having such considerable timing errors are not suitable for systems that are sensitive to timing.

However, with the memory device 100 of the invention, it is possible to minimize errors of the timing by which the second ready signal changes to the ready state, by selecting a proper ready generating timing value.

Also, using various kinds of memory cores usually involves varied latency periods. However, it is easy to use the memory devices with a uniform latency period by equipping the I/F circuit of each memory device with the inventive technique of generating the second ready signal on the basis of the first ready signal and the ready generating timing value.

Also, a nonvolatile memory device generally goes through a process of programming data in the memory array 1 at the time of shipment. Accordingly, when the memory portion 10 includes the ready-generating-timing original information storing portion 2, it is easy to arbitrarily set/change the original information about the ready generating timing value at the time of shipment (i.e., the original information can be set/ changed more flexibly at the time of shipment).

Also, the ready generating timing value setting portion 22 is capable of changing the setting of the ready generating timing value, and the ready generating timing value is changed on the basis of an operation applied from outside. Therefore, the host can arbitrarily change/set the ready generating timing value to an optimum value.

In the memory device 100, the input of commands (instructions) and the output of data can be performed on the same bus by time-division multiplexing. However, separate buses may be provided so that the input of commands (instructions) and the output of data can be performed on individual buses.

The memory device 100 may be a device that performs input operations of commands (instructions) and output operations of data in synchronization with rising or falling of the clock signal CLK. When there is no clock signal CLK, for example, the memory device 100 may be configured as an asynchronous memory.

The operations of the memory device 100 have been described on the assumption that the memory device 100 is a read-only device. However, needless to say, the memory device 100 of the invention may be programmable (data-writable) and data-erasable. When the memory device 100 is a programmable and data-erasable device, it is also possible to offer a uniform latency time in programming and data erasing, as described above.

In the memory device 100 described above, the clock signal CLK is continuously supplied also between the input of a command (instruction) to the output of data. However, the memory device 100 may be constructed such that the supply of the clock signal CLK is stopped (fixed at "H" or fixed at "L") during latency periods.

When the ready-generating-timing original information storing portion 2 resides within the memory core of the memory array 1 (in the same area as the area storing specified data in the memory array 1), it is preferable to separately provide the ready generating timing value setting portion 22 as described above.

However, when the ready-generating-timing original information storing portion 2 resides outside of the memory core of the memory array 1 (when it resides in an area separate from the specified data storing area in the memory array 1), it is not necessary to separately provide the ready generating timing value setting portion 22. In this case, the controller 21 directly reads the ready timing value in the ready-generating-timing original information storing portion 2 (without through the ready generating timing value setting portion 22).

When the ready-generating-timing original information storing portion 2 stores information expressed in, e.g., a unit of time, the time unit may be converted to the number of clocks when it is set as the ready generating timing value in the ready generating timing value setting portion 22.

The example above has shown the ready signal sending portion 20 formed as hardware. However, the ready signal sending portion 20 may be formed as software. For example, a given program may be installed in the controller 21 such that the operations of the ready signal sending portion 20 can be implemented as defined in the program.

In the example above, the controller 21 monitors the sense amplifier 5 and generates the first ready signal. However, in another preferred embodiment, the sense amplifier 5 itself may generate the first ready signal.

The example has shown operations of the memory device of the invention that are performed to read specified data. However, the memory device of the invention is applicable also to operations of writing or erasing specified data.

For example, in an operation of writing specified data, a command about writing of specified data and the specified data to be written are inputted to the memory device 100, and then the first ready signal is placed in a busy state, the enabling signal is placed in a disable state, and the second ready signal is placed in a busy state. Then, when the controller 21 senses the end of the operation of writing the specified data to the memory portion 10, the ready signal sending portion 20 sends the second ready signal in a ready state to the external device.

That is, the ready signal sending portion 20 sends the ready signal (which can be regarded as a ready-state second ready signal) to the outside when both of the first and second conditions are satisfied, where the first condition is satisfied when the end of the operation of writing specified data to the memory portion 10 is detected, and the second condition is satisfied when a preset ready generating timing is satisfied.

In an operation of erasing specified data, the memory device 100 receives a command about erasure of specified data, and then the first ready signal is placed in a busy state, the enabling signal is placed in a disable state, and the second ready signal is placed in a busy state. Then, when the controller 21 senses the end of the operation of erasing the specified data from the memory portion 10, the ready signal sending portion 20 sends the second ready signal in the ready state to the external device.

That is, the ready signal sending portion 20 sends the ready signal (which can be regarded as a ready-state second ready signal) to the outside when both of the first and second conditions are satisfied, where the first condition is satisfied when the end of the operation of erasing specified data from the memory portion 10 is detected, and the second condition is satisfied when a preset ready generating timing is satisfied.

While the invention has been described in detail, the foregoing description is in all aspects illustrative and not restrictive. It is understood that numerous other modifications and variations can be devised without departing from the scope of the invention.

What is claimed is:

1. A memory device that receives from outside a command about reading, writing, or erasing of specified data, and that sends a ready signal to the outside when said specified data has become ready for reading on the basis of said command, or when an operation of writing or erasing said specified data has ended on the basis of said command, said memory device comprising:
    a memory portion that is capable of any of reading, writing, and erasing of said specified data; and
    a ready signal sending portion that sends said ready signal to the outside when a first condition and a second condition are both satisfied, where said first condition is satisfied when a state in which said specified data is ready for reading from said memory portion is detected, or when an end of the operation of writing or erasing said specified data to or from said memory portion is detected, and said second condition is satisfied when a preset ready generating timing is satisfied, and
    said ready signal sending portion monitors said memory portion to detect the state in which said specified data is ready for reading from said memory portion, or to detect the end of the operation of writing or erasing said specified data to or from said memory portion, and said ready signal sending portion generates a first ready signal that changes from a busy state to a ready state after the detection, and an enabling signal that changes from a disable state to an enable state on the basis of a preset value of the ready generating timing, and said ready signal sending portion sends a second ready signal in a ready state to the outside when said first ready signal is in the ready state and said enabling signal is in the enable state.

2. The memory device according to claim 1, wherein said ready signal sending portion comprises:
    a first ready signal generating portion that generates said first ready signal;
    a ready generating timing value setting portion that is capable of setting said ready generating timing value;
    an enabling signal generating portion that generates said enabling signal that goes into said disable state when said command about reading, writing, or erasing is inputted, and that goes into said enable state according to a timing based on said ready generating timing value; and
    a second ready signal generating portion that receives said first ready signal and said enabling signal to generate said second ready signal.

3. The memory device according to claim 2, wherein said memory portion comprises an area where original information about said ready generating timing value is stored, and
    when a given command sent from outside is received, said ready generating timing value is set in said ready generating timing value setting portion on the basis of said original information.

4. The memory device according to claim 2, wherein said ready generating timing value setting portion is capable of changing said ready generating timing value in setting state, and
    said ready generating timing value is changed on the basis of an operation applied from outside.

* * * * *